(No Model.)
T. H. BESSE.
ICE CREAM FREEZER.
No. 493,906. Patented Mar. 21, 1893.
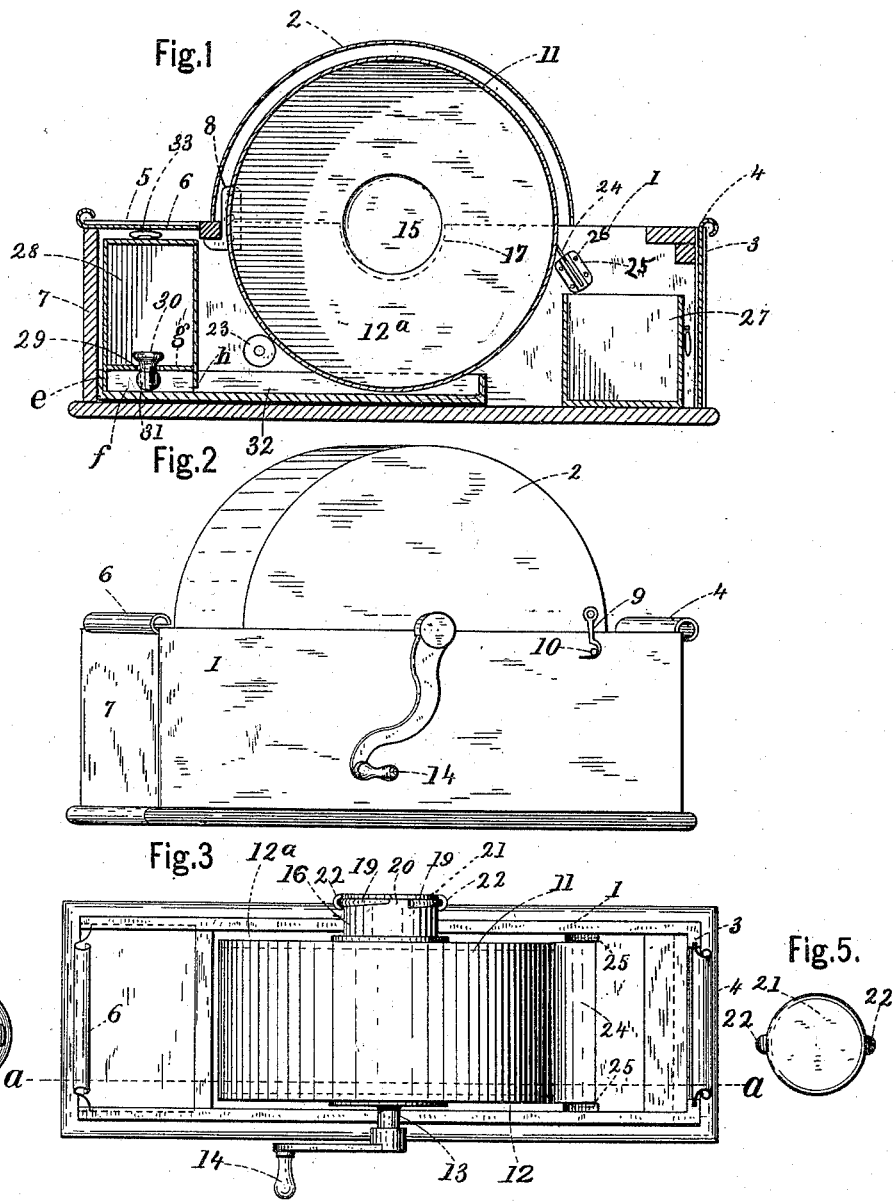
Witnesses.
Alexander Gleason
James A. Lowe
Thomas H. Besse, Inventor.
By James Sangster
Attorney.

United States Patent Office.

THOMAS H. BESSE, OF BUFFALO, NEW YORK.

ICE-CREAM FREEZER.

SPECIFICATION forming part of Letters Patent No. 493,906, dated March 21, 1893.

Application filed October 18, 1892. Serial No. 449,227. (No model.)

*To all whom it may concern:*

Be it known that I, THOMAS H. BESSE, a citizen of the United States, residing at Buffalo, in the county of Erie and State of New York, have invented certain new and useful Improvements in Ice-Cream Freezers, of which the following is a specification.

My invention relates to certain improvements in ice cream freezers, whereby the freezer is greatly simplified in its construction and is rendered more effective in its operation, all of which will be fully and clearly hereinafter described and claimed, reference being had to the accompanying drawings, in which:—

Figure 1 is a longitudinal section in or about line $a\ a$, Fig. 3. Fig. 2 is a perspective view of the freezer complete. Fig. 3 represents a plan view of the freezer. Fig. 4 is a bottom view of the stopper for the removable cream vessel. Fig. 5 is a face view of the cap for closing the opening in the side of the refrigerating cylinder after the refrigerating material has been introduced.

The outer casing or box, 1, is preferably made of wood as being the lightest and best material. The removable cover or top, 2, may also be made of wood but any suitable material may be used. One end of the box is provided with vertical slideways, 3, and a vertical sliding door, 4. The opposite end of the box 1 is provided with horizontal slideways, 5, and a horizontal sliding door or cover, 6, the end, 7, being a closed end. The removable cover or top, 2, is secured in place when put on, at one end by the hook catches 8, one secured to each inner side of said top by screws or other well known means, and at the opposite end is an ordinary pivoted hook catch, 9, which catches over a pin, 10, near that end of the box, 1. By this construction the cover is made readily removable and is securely held in place when put on.

The refrigerating cylinder is made preferably of sheet metal for the circular case, 11, and the sides, 12, and $12^a$, of cast iron, which is galvanized so that the rim, 11, can be soldered and thereby be held together securely. A short shaft, 13, is cast or otherwise secured to the closed side, 12. To the outer end of the shaft, 13, is secured a handle 14, by which the refrigerating cylinder is operated. On the opposite side, $12^a$, is an opening, 15, see Fig. 1 through which the ice and salt or refrigerating material are introduced for freezing the cream. This opening, 15, is about three inches in diameter or sufficiently large to admit the refrigerating material. Surrounding this opening 15, is an outwardly projecting flanged collar, 16, see Fig. 3, which may be cast in one piece with the side, $12^a$. This collar, 16, is long enough to act as a bearing half for that side of the cylinder and rests within a semicircular bearing in that side of the box, 1, shown by the dotted lines, 17, in Fig. 1.

On the end of the collar, 16, are two projecting ribs, 19, which extend partly around it so as to leave openings, 20, between them. These ribs, 19, are made slightly wedge shaped so as to act substantially as a screw when this cover, 21, is put on, the cover 21 being provided with overlapping hook portions, 22, which pass between the openings, 20, between the ends of the ribs, 19, and clasp over side ribs, so as to draw the cover closely in place as it is turned. To insure a tight joint a well known soft rubber ring is used in the usual way.

Mounted in the ordinary bearings is a supporting roller 23, located so as to rest at one of the lower sides of the refrigerating cylinder. The opposite side of the refrigerating cylinder rests against the scraper, 24. The scraper, 24, is secured in place by two cast metal slideway pieces, 25, which are secured to each inner side of the box by the ordinary screws, 26, see Fig. 1. In each of these slideway pieces is a groove or slideway and each side of the scraper when in place fits in these grooves so that the weight of the refrigerating cylinder rests on the supporting roller and the scraper as will be understood by reference to Fig. 1. This construction, as will be seen, holds the refrigerating cylinder slightly above its bearings, see dotted lines, 17, in Fig. 1.

Below the scraper is the ice cream receptacle or box, 27. This is made in the usual way and is taken out by lifting the door 4.

At the opposite end of the box, 1, is a removable reversible cream receptacle 28. One end of this receptacle is made air tight and at the opposite end is an opening, 29, (see Fig. 1) in which is fitted a stopper, 30. This stopper, 30, is made so that when pulled partly outward it will fit air tight and when pushed partly inward openings, 31, see Figs. 1 and 4, will be left so that the cream may flow from the holding vessel. Both the upper and lower ends of the stopper, 30, are made large enough to stop it from being forced entirely out of the opening in which it is fitted. This cream holding vessel is fitted by reversing it and pushing the stopper inward so the liquid cream can be poured in. The stopper is then drawn outward so as to make it fit tight or close the opening. When the cream vessel is reversed the weight of the stopper is sufficient to cause it to drop and close the opening so that the cream cannot flow out. The sides $e$ and $f$, of the cream holding vessel project beyond the face, $g$, in which the stopper is placed while the side, $h$, does not project down quite so far. The object of this construction will appear farther on. It is then reversed so that the stopper is at the bottom in which position the vessel is set in the cream pan, 32, the stopper being long enough so that its end touches the cream pan thereby causing it to be forced inward and thus make an opening through which the cream can flow.

From the above construction it will be seen, that as the side, $h$, projects a little up from the bottom of the cream pan the cream will flow until its level is sufficiently high to seal the opening. The pressure of the atmosphere will then hold the cream in the vessel but as the refrigerating cylinder projects down to the bottom of the cream pan and as it is being turned it carries the cream up with it, which as it is frozen is taken off by the scraper. This operation being continued the level of the cream in the cream pan is lowered until a portion of air passes up through the opening around the stopper into the cream vessel. This allows the cream to flow out again until the level rises high enough to seal the opening. This operation may be continued until all the cream in the cream vessel is taken out and frozen. This cream vessel is taken out through the top of the box, 1, by removing the cover, 6, and taking hold of the ring, 33, shown in Fig. 1.

The object in locating the supporting roller on one side of the refrigerating cylinder above the cream pan and the scraper on the opposite side so as to support it or partly support it to its bearing is to avoid the use of springs and still keep the scraper in contact with the cylinder at all times during its operation.

I claim as my invention—

The combination in an ice cream freezer, of a refrigerating cylinder provided with a means for turning it and mounted in bearings in the freezer box, a supporting roller for supporting one side of the cylinder and a scraper supporting the opposite side, a cream pan for holding the cream located under the refrigerating cylinder and a vessel for receiving the frozen cream substantially as described.

THOS. H. BESSE.

Witnesses:
JAMES SANGSTER,
WM. M. BOWEN.